Oct. 28, 1969  J. H. STROOP  3,475,521
METHOD OF MAKING PLASTIC CONTACT LENSES
Filed March 4, 1966  2 Sheets-Sheet 1
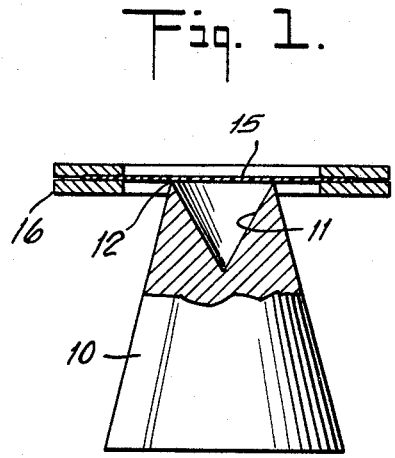
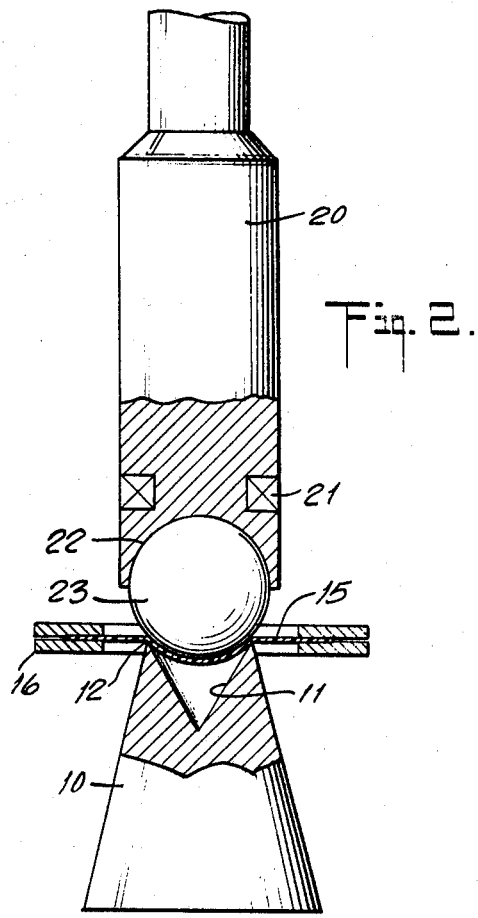
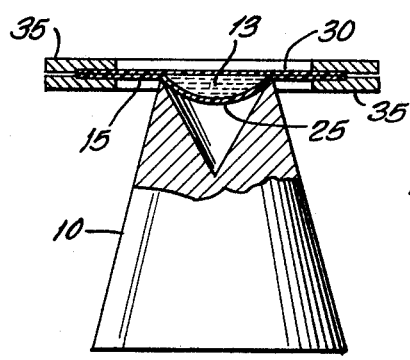
INVENTOR.
JOHN H. STROO
BY
ATTORNEY Oct. 28, 1969  J. H. STROOP  3,475,521
METHOD OF MAKING PLASTIC CONTACT LENSES
Filed March 4, 1966  2 Sheets-Sheet 2

INVENTOR.
JOHN H. STROOP
BY
ATTORNEY

United States Patent Office 3,475,521
Patented Oct. 28, 1969

3,475,521
METHOD OF MAKING PLASTIC CONTACT LENSES
John H. Stroop, 153 Norfolk St., New York, N.Y. 10002
Filed Mar. 4, 1966, Ser. No. 531,972
Int. Cl. B29d 11/00; B29c 17/08; B29h 3/06
U.S. Cl. 264—1
2 Claims

ABSTRACT OF THE DISCLOSURE

A method of making plastic contact lenses, without requiring preformed cavity molds, by using two polished plastic sheets or films which are formed into their desired shapes by means of spherical balls, one ball being of such predetermined size for forming the particular anterior or corrective curvature of the lens and the other ball being selected for forming the particular posterior or corneal curvature of the lens. The interior of the lens may be a clear liquid contained by the plastic sheets or a solidifying clear substance. If a clear solidified substance, the plastic sheets may be stripped away or left in place. The method provides a finished lens in any of these forms without trimming or polishing.

---

Plastic contact lenses have been proposed heretofore; for example, B. L. Wilhelm Patent 1,929,228, issued Oct. 3, 1933, and H. R. Morton Patent 2,241,415, issued May 13, 1941.

Plastic contact lenses as hitherto manufactured are made primarily of solid plastics which are machined by a highly intricate process and polished for optical purposes, or they are moulded by the use of very expensive dies. Both of these methods are expensive, and the product in either case is not totally satisfactory. It is very difficult to get a complete fit of either of these products to the varying dimensions of the cornea or the other regions of the eyeball of the wearer. Failure of a perfect fit causes considerable discomfort, and this factor is equally inherent in both of the above methods.

One important object of this invention is to avoid the use of the expensive methods of manufacturing plastic contact lenses hitherto in use, to provide a simple and inexpensive method for this purpose and to produce a lens which is unusually comfortable to the wearer.

Another object of the invention is to utilize plastic films of uniform thickness in the construction of contact lenses.

Another object is to provide a method of manufacturing plastic contact lenses from plastic films of uniform thickness by a series of steps preferably employing chrome steel balls of high quality for producing the desired curvature on the outer corrective surface and also the desired curvature on the inner surface corresponding exactly to the cornea of the eye of the wearer.

Another object is to produce contact lenses from films of chlorotrifluoroethylene-based copolymers. These plastics are ideally suited to the needs of contact lenses because they are very inert chemically and have very fine optical properties as to their refractive index. Moreover, they are adapted to be formed into extremely thin films so that the contact lens may be most economically formed therefrom by the extremely simple procedure of this invention.

Another object of the invention is to provide a completely pliant marginal area of the contact lens which is extremely thin and is peculiarly comfortable in contact with the eye of the user. The aforesaid chlorotrifluoroethylene has an additional advantage for use in the production of the marginal area because of its soft pliant nature in addition to the optical properties and high inert qualities above referred to.

Another object of this invention is to form very thin plastic films into desired curvatures corresponding respectively to the curvature of the cornea and the curvature required for the desired optical correction, and to inject a plastic substance between the films, which substance is adapted to solidify so as to form and perpetuate the contact lens with or without the films which may be stripped away.

The invention will be better understood by reference to the accompanying drawings, in which:

FIG. 1 illustrates a forming ring with the first plastic film stretched upon it.

FIG. 2, in addition to the forming ring, has a forming tool holding a sphere for moulding the first film with the corrective curvature of the finished lens.

FIG. 3 shows the next step in the procedure in which a liquid or jelly-like molten thermoplastic 13 fills the cup-shaped cavity formed by the moulding ball shown in FIG. 2. A second film is here shown stretched over the first film and over the forming ring whereby the space within the aforesaid pocket is completely filled.

According to the next step, as shown in FIG. 4, a forming tool holds a chrome steel ball having a radius of curvature corresponding to that of the cornea of the eye of the wearer.

Figure 6:
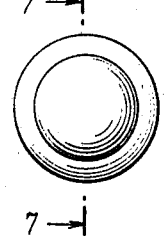
FIG. 6 is an elevation of a finished lens with a flexible marginal rim.
Figure 7:
FIG. 7 is a sectional view of the same lens taken on the line 7—7 of FIG. 6.
Figure 8:
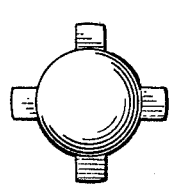

The marginal extension may be in the form of a ring, as shown in FIGS. 6 and 7, or preferably is in the form of tabs, as shown in FIG. 8, to reduce the total amount of material in the lens and to produce additional flexibility of the margin of the lens.

Referring specifically to the drawings, a forming ring 10 has a frusto-conical shape, a conical opening 11 in the top which forms a circular edge 12 over which a first plastic film 15 is stretched. The film is maintained in a stretched position by clamp ring 16. A forming tool 20, as clearly shown in FIG. 2, is provided with electric heating element 21 near its lower end and is formed into a hemispherical opening 22 in the bottom. A ball 23, preferably formed of highly polished chrome steel, is fitted into the hemispherical opening 22 and is forced downwardly against the plastic film 15 until the sphere is supported by the circular edge 12 of the forming ring. The forming tool 20 is forced downwardly by any suitable means, not shown, and the electric heater 21 heats the body of the forming tool 20 so that heat is imparted to the steel ball 23.

The temperature is regulated so that the steel ball is just warm enough to soften the film 15 and thus a permanent curvature having the same radius as the ball 23 is formed in the first plastic film 15.

At this point the forming tool and steel ball are removed and the cup 25 is allowed to cool and maintain a permanent set. The cup 25 may be filled with a suitable liquid or it may be filled with the same molten plastic material of which the films are formed, or a similar plastic material which may be introduced in the form of a jelly or paste as indicated at 13 in FIG. 3.

Thereafter a second film 30 is stretched over the cup 25 and is held together with the first film 15 in a clamp ring 35.

Figure 4:
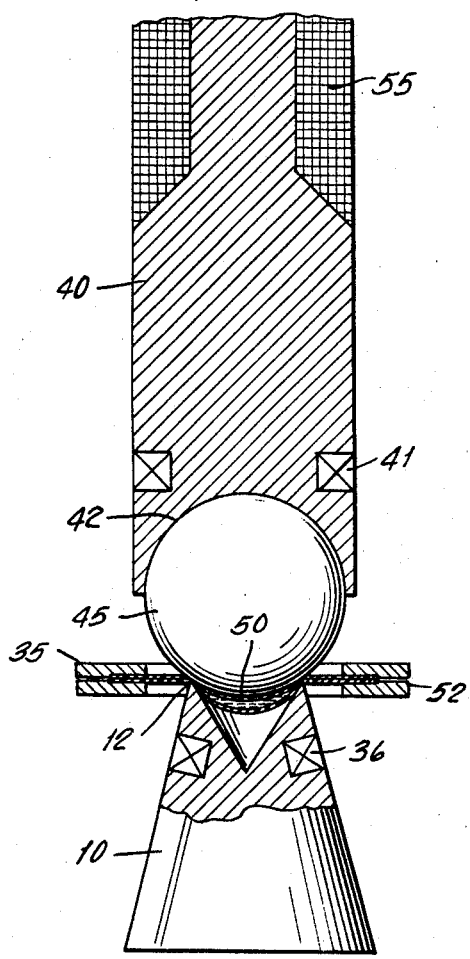

As shown in FIG. 4, the forming ring 10 may now have the function of a shear ring and anvil, and preferably has an electric heater 36 located a short distance below the circular edge 12. A forming tool 40, which corresponds to the forming tool 20, has an electric heater 41 and has a hemispherical pocket 42 at the bottom in which ball 45, preferably of polished chrome steel, is supported.

When the forming tool and the ball 45 are forced downwardly, the second film 30 is warmed by the heat from the heater 41 and permanently forms the inner curvature 50 of the lens.

As the ball 45 is forced downwardly, the excess liquid or semi-liquid substance 13 contained in the pocket 25 is squeezed outwardly through vent 52 in the clamp ring 35.

It will be understood that the radius of curvature of the corneas of individuals varies to an important extent although the variation in curvature is not very great. The forming tool 40 may be used with any one of a number of steel balls of different radii, the ball being very carefully selected to produce the curvature corresponding to the cornea of the individual wearer.

Likewise a number of balls of slightly varying radii may be utilized with the forming tool 20 in order that the radius of correction may be exactly adapted to the individual user.

To produce the dies of the usual structure to form these operations would involve very large expense. On the other hand, it is possible to obtain a plurality of steel balls varying in radius by very slight increments. It is usual to provide only a single tool to hold any one of many steel balls as desired, and the tool may have a flexible snap-in cage (not shown) of well known construction to hold the individual ball in place and to allow easy replacement by a ball of another size.

The circular edge 12 of the shear ring and anvil 10 is sufficiently sharp that when adequate pressure is applied to tool 40 and ball 45, not only are the films sealed together enclosing the liquid or semi-liquid substance, but also the lens is severed from the films.

Figure 5:
FIG. 5 is a sectional elevation of the finished lens.

The lens thus formed is shown in sectional elevation in FIG. 5.

It is preferable that the tool 40 and the ball 45 are first used to permanently form the film 30 and after the heat at 41 has been shut off and the structure cooled, heater 36 may be turned on to warm the cutting edge 12 so that the downward pressure of the ball 45 will thereupon sever the lens from the films. In many cases it is not desirable to sever the lens from the films. Assume that the pressure of the tool 40 is not sufficient to sever the films, but only to weld them together. In such case after the lens formed between the films is solidified, the films may be stripped off and the completed lens ready for use. In case the films are to be used primarily as moulds and stripped off when the lens is completed, then in such event one or both of the films may be thin metallic films.

While tool 20 of FIG. 2 and 40 of FIG. 4 are shown with spherically curved concave supporting surfaces on which the hardened steel balls 23 and 45 are contacted, these tools will usually have plane surfaces on which the balls contact particularly because a ball of one size is frequently replaced by a ball of a different size, and the well known snap-in cage keeps the balls from falling out.

The tool 40 may have an electrical transducer 55, in which case it will be unnecessary to provide heater 36 in the forming ring 10, and the use of the transducer in this way will cause localized heating at the circular edge 12, thereby sealing the plastic films at the rim of the contact lens and at the same time cutting the lens and separating a complete lens as shown in FIG. 5.

If the heater 36 is employed, a longer time element will be required to permit the forming ring to cool before it is used for making another lens. Hence the transducer arrangement greatly speeds up the operation.

The specific arrangement shown and described is illustrative of my invention, and variations may be made by those skilled in the art without departing from the spirit of the invention.

I claim:

1. The method of producing a contact lens which comprises forming a corrective radius curve in a first plastic film of substantially uniform thickness by forcing a first heated steel ball having a predetermined radius of curvature against said first film while horizontally supported on a forming ring; filling the concave cavity formed in said first plastic film with a transparent refractive plastic substance in flowable form; superposing a second plastic film of substantially uniform thickness over said concave cavity and filler substance and forming a corneal radius curve in said second film by forcing a second heated steel ball having a greater radius of curvature against said second film; said forming ring contacting said first plastic film only at the periphery of said concave cavity and the two films being sealed together at said periphery by heat and pressure during the second forming step.

2. A method as defined in claim 1, further including the steps of solidifying the transparent refractive plastic substance between the two films and stripping off said first and second films from the solidified refractive substance.

References Cited

UNITED STATES PATENTS

| | | | |
|---|---|---|---|
| 1,929,228 | 10/1933 | Wilhelm | 351—160 |
| 2,247,628 | 7/1941 | Beitel | 351—160 |
| 2,964,501 | 12/1960 | Sarofeen | 351—160 X |
| 2,990,574 | 7/1961 | De Carle | 351—160 X |

FOREIGN PATENTS

| | | |
|---|---|---|
| 845,282 | 8/1960 | Great Britain. |
| 1,362,595 | 4/1964 | France. |
| 861,753 | 1/1953 | Germany. |

DAVID H. RUBIN, Primary Examiner

U.S. Cl. X.R.

18—19; 264—153, 163, 220, 266, 316, 320; 351—160, 177